United States Patent
Erickson et al.

(10) Patent No.: US 9,877,357 B2
(45) Date of Patent: Jan. 23, 2018

(54) CHANGING WIRELESS CARRIERS DURING A MOBILE GATEWAY SESSION

(71) Applicant: Trimble Navigation Limited, Sunnyvale, CA (US)

(72) Inventors: Kjell David Erickson, Richfield, MN (US); Lloyd Walter Matson, Buffalo, MN (US); Mark Philip Botticelli, North Grafton, MA (US)

(73) Assignee: TRIMBLE NAVIGATION LIMITED, Sunnyvale, CA (US)

( * ) Notice: Subject to any disclaimer, the term of this patent is extended or adjusted under 35 U.S.C. 154(b) by 0 days.

(21) Appl. No.: 14/829,020

(22) Filed: Aug. 18, 2015

(65) Prior Publication Data

US 2016/0050609 A1 Feb. 18, 2016

Related U.S. Application Data

(60) Provisional application No. 62/038,615, filed on Aug. 18, 2014.

(51) Int. Cl.
*H04W 88/10* (2009.01)
*H04W 48/18* (2009.01)
*G08G 1/00* (2006.01)

(52) U.S. Cl.
CPC .......... *H04W 88/10* (2013.01); *H04W 48/18* (2013.01); *G08G 1/20* (2013.01)

(58) Field of Classification Search
CPC ..... H04W 88/08; H04W 88/10; H04W 88/12; H04W 88/16; H04W 48/17; H04W 48/18; H04W 48/20; G08G 1/161; G08G 1/164; G08G 1/166; G08G 1/20
See application file for complete search history.

(56) References Cited

U.S. PATENT DOCUMENTS

| | | | |
|---|---|---|---|
| 2004/0160927 A1* | 8/2004 | Yang | H04W 24/00 370/338 |
| 2009/0325572 A1 | 12/2009 | Ji | |
| 2010/0083121 A1* | 4/2010 | Famolari | H04L 69/18 715/736 |
| 2014/0045147 A1* | 2/2014 | Mohn | G08G 1/00 434/69 |

OTHER PUBLICATIONS

I.F. Akyildiz ; S. Mohanty ; Jiang Xie A ubiquitous mobile communication architecture for nextgeneration heterogeneous wireless systems IEEE Communications Magazine ( vol. 43, Issue: 6, Jun. 2005).*

Yunhong Gu , Robert L. Grossman UDT: UDP-based data transfer for high-speed wide area networks Computer Networks vol. 51, Issue 7, May 16, 2007, pp. 1777-1799.*

International Search Report and Written Opinion dated Dec. 11, 2015 for PCT Application No. PCT/US2015/045670, 13 pages.

* cited by examiner

*Primary Examiner* — Noel Beharry
*Assistant Examiner* — Sharmin Chowdhury
(74) *Attorney, Agent, or Firm* — Hollingsworth Davis, LLC

(57) ABSTRACT

A first performance measure is determined of an existing data session between a mobile gateway and a cloud gateway via a first wireless carrier. Second performance measures of others of the wireless carriers are determined during the existing data session. Based on the first performance measure and the second performance measures, the existing data session is continued with the cloud gateway via a second of the wireless carriers.

16 Claims, 7 Drawing Sheets

CHANGING WIRELESS CARRIERS DURING A MOBILE GATEWAY SESSION

RELATED APPLICATIONS

This application claims the benefit of Provisional Patent Application No. 62/038,615, filed on Aug. 18, 2014, to which priority is claimed pursuant to 35 U.S.C. §119(e) and which is incorporated herein by reference in its entirety.

SUMMARY

The present disclosure is related to vehicle data systems. In one embodiment, method, systems, apparatuses, and computer-readable medium facilitate determining a first performance measure of an existing data session between a mobile gateway and a cloud gateway via a first wireless carrier. Second performance measures of others of the wireless carriers are determined during the existing data session. Based on the first performance measure and the second performance measures, the existing data session with the cloud gateway is continued via a second wireless carrier.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

In general, the disclosure is directed to techniques for utilizing vehicle data. Such data, which may include any data generated by onboard sensors, may be used to manage operation of private or commercial vehicles. In some systems, motor vehicles are equipped with communication devices that communicate data to a data center or other central office system. While the vehicles and/or drivers need not have any association with one another, the vehicles may be part of one or more fleets of vehicles, such as in the trucking industry. The central office may serve as a fleet management system (FMS) in which the trucks or other vehicles communicate, regardless of which fleet, if any, they may be associated with.

The solutions presented herein utilize the data gathered by vehicle sensor systems to provide information to the clients via a cloud gateway. Generally, the cloud gateway is an intermediary between vehicle computers that gather fleet data and end-users of the fleet data. The cloud gateway acts as a message broker that receives, processes, categorizes, and distributes the fleet data. The system utilizes multiple wireless networks in order to maintain high reliability of messaging from the vehicles.

Figure 1:
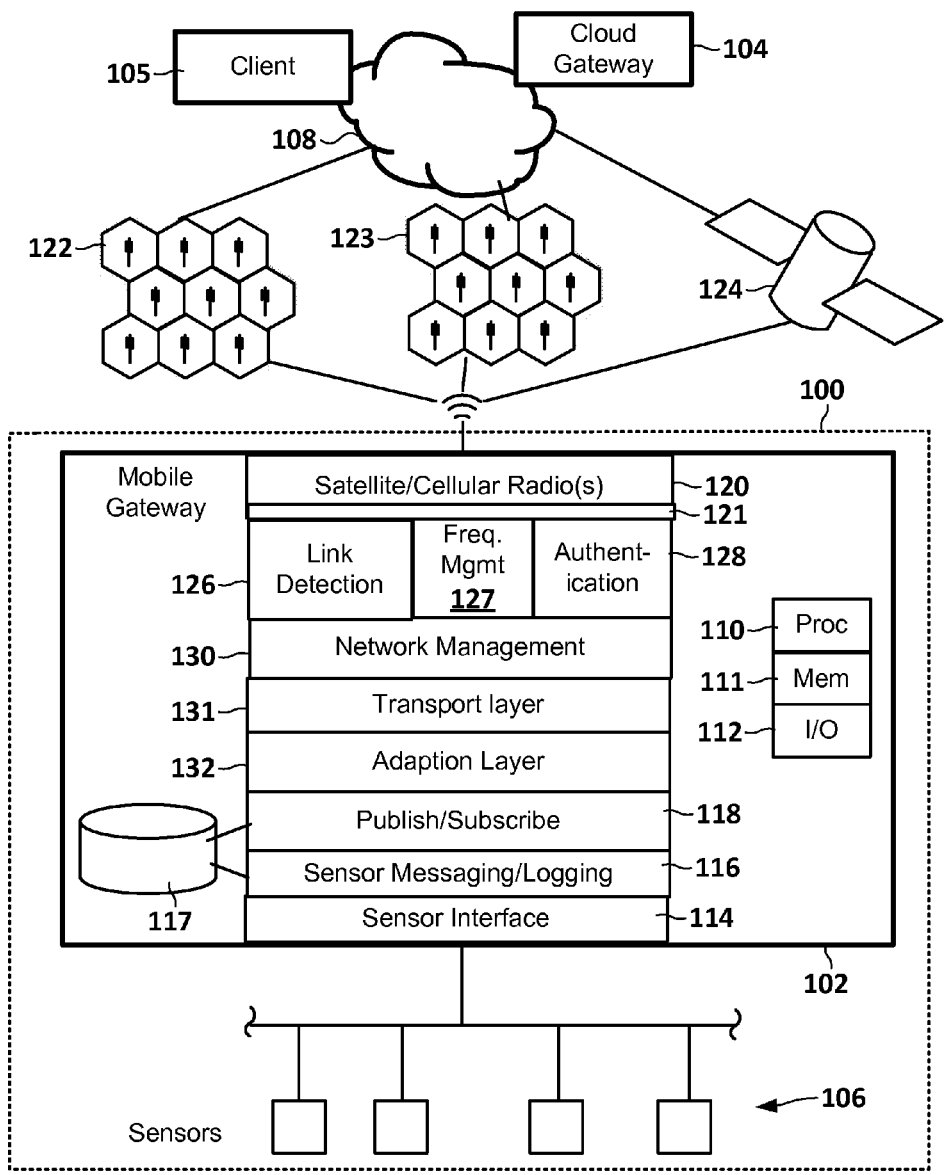
FIG. 1 is a block diagram of a mobile gateway within a vehicle data system according to an example embodiment.

In reference now to FIG. 1, a block diagram illustrates a vehicle data system according to an example embodiment. The confines of a vehicle are generally indicated by dashed line 100, which encompasses a mobile gateway 102 and sensors 106. The mobile gateway 102 serves generally as a data collection and disbursement device, and may include special- or general-purpose computing hardware, as indicated by processor 110, memory 111, and input/output (I/O) circuitry 112. The mobile gateway 102 includes a sensor interface 114 that may be coupled to directly to the sensors 106 and or to external data gathering components such as sensor controller (not shown). The sensor interface 114 may include data transfer interfaces such as serial port (e.g., RS-232, RS-422, etc.), Ethernet, Universal Serial Bus (USB), Controller Area Network (CAN), power-line communication, IP networking (e.g., Universal Plug and Play), $I^2C$ bus, Serial Peripheral Interface (SPI) bus, vehicle computer interface, etc.

The mobile gateway 102 includes a sensor messaging/logging component 116 that receives sensor data via the sensor interface 114. The messaging/logging component 116 processes various streams of data from the sensor interface 114 (which may include multiple interfaces) and other data sources 118. For purposes of this disclosure, a "stream" or "feed" of data refers to a sequence of data messages on a related subject. As such, the stream/feed may not require a continuous connection or other continuity associated, e.g., with streaming media. Generally, as long as a received message can be correlated associated with other messages received at a different time, these messages may be collectively referred to as a stream or feed.

The mobile gateway 102 may be able to receive and/or generate messages that encapsulate data that originated from sources such as sensors 106. The messaging/logging component 116 at least classifies the messages and stores the message data in a persistent data store 117. The data store 117 may include a hard drive or flash memory, and the messaging/logging component 116 may process the messages (e.g., compression, discarding of old data) to ensure the data store 117 doesn't become full.

The messaging/logging component 116 may attempt to categorize the data received via the sources and store it appropriately in the data store 117. For example, the data store 117 may include a relational database that stores numeric or text data, and one table of the database may have columns such as TIMESTAMP, DATA_TYPE and DATA, where DATA_TYPE is an enumerated type (e.g., temperature, geolocation, percentage, etc.). However, the DATA_TYPE column may be redundant for large data sets, and instead a different table may be formed for each type of data. Other types of data, such as images, audio, video, may use other storage conventions.

Generally, the messaging/logging component 116 may only need to interpret the incoming data so that it can be efficiently stored, and other components, such as the publish/subscribe component 118, may perform additional interpretations/transformations and/or create more sophisticated representations and categorizations of the data. An example of the former is converting temperature readings from a variety of sensors to a common format, e.g., degrees C. An example of the latter is using sensors that detect fuel flow and speed to derive fuel consumption, both instantaneous consumption and a running average. The running average fuel consumption can be combined with a fuel level sensor to derive a range in miles until fuel is empty. These derived values can also be stored in the data store 117 and/or dynamically calculated as needed.

Besides categorizing data, the publish/subscribe component 118 implements a pattern that is useful for providing customized views of data. In a publish/subscribe model, publishers of messages do not program the messages to be sent directly to subscribers. Instead, published messages are characterized into topics (or named logical channels), without knowledge of what, if any, subscribers there may be. Similarly, subscribers express interest in one or more topics, and only receive messages that are of interest, without knowledge of what, if any, publishers there are.

In the present example, the publish/subscribe component 118 categorizes the vehicle data into appropriate topics, such as telemetry data (e.g., geolocation, speed, altitude, direction.), engine data (e.g., coolant temperature, generator voltage, airflow, engine speed), cargo data (e.g., temperature, vibration), etc. The list of topics may expand or contract based on sensors detected via the sensor interface 114. For example, if a rear-view camera is added, the feed (either static images or video) can be added to one or more topics, such as telemetry data, and/or have its own topic created, e.g., "on-board video."

Subscribers in a topic-based system may receive some or all messages published to the topics to which they subscribe, and all subscribers to a topic may receive the same messages. Customizations may be used (e.g., filters) that allow blocking certain messages on a particular topic. The publisher defines the classes of messages to which subscribers can subscribe, and associate those messages with the various topics as appropriate. Thereafter, a mechanism such as HTTP, syndication feed, email, etc., may be used to send out the messages via a wide area network 108 (e.g., cellular networks, satellite networks, Wi-Fi®, the Internet). This results in dynamic presentation of the sensor data, e.g., a time varying view of data that may be in real-time or near-real time.

The publish/subscribe component 118 may be part of a wider publish/subscribe system of a fleet management system. For example, a cloud gateway 104 is an infrastructure middleware service that subscribes to a set of messages from the mobile gateway 102 via the wide area network 108. These messages are stored and may be further processed by the cloud gateway 104. Clients 105 include subscriber devices such as computers used by fleet management services, customers, and third parties, and subscribe to the messages via a publish/subscribe service of the cloud gateway 104. The cloud gateway 104 may aggregate similar messages from a large number of vehicles, providing an overall picture of fleet activity, for example. The aggregation may involve statistical values (e.g., averages, medians) and may involve other forms of data processing sometimes associated with time or location varying data, such as smoothing, interpolation, extrapolation, prediction, etc.

As seen in FIG. 1, the mobile gateway includes one or more radios 120 that facilitate wireless data transmission to the wide area network 108. Access to the wide area network 108 is facilitated by cellular networks 122-123 and/or satellite network 124. The cellular networks 122-123 utilize ground base stations that cover particular regions, or cells. The cellular networks 122-123 include provision for switching between cells as a receiver moves. The cellular networks 122-123 include other features, such as managing account access and providing packet data services. The satellite network 124 (e.g., Iridium network) includes space-based stations in orbit, and may be augmented by ground stations in some cases. Generally, the satellite network 124 also includes provisions similar to a cellular network, such as managing switching between stations, handling network authentication/access, and providing packet data services.

In order to maintain near-constant contact with the mobile gateway 102, the system needs to be adaptable to deal with gaps in wireless network coverage, yet minimize cost. Generally, the more complete the coverage, e.g., the satellite network 124, the higher the costs. While cellular networks have provided coverage in relatively unpopulated areas (e.g., along major roads and highways), a long-distance traveler may still experience drop outs over any given network. As a result, the mobile gateway 102 and cloud gateway 104 include features that facilitate increased reliability while minimizing cost.

One aspect of obtaining high-availability of the mobile gateway 102 involves determining end-to-end connectivity at least between the mobile gateway 102 and cloud gateway 104. In the illustrated example, this is determined using link detection component 126. The link detection component 126 analyzes the connection availability of the multiple carrier networks 122-124. In some scenarios, e.g., roaming on cellular networks, and alternate compatible carrier may be utilized if the base station signal of the primary carrier cannot be detected, or is below a threshold. While the link detection component 126 may use signal strength as one indicator, this is not the only indicator of interest.

In some cases, even though base station signal strength may be acceptable, data traveling from the base station to the wide area network 108 may be limited due to factors such as network congestion, failure of a routing path, etc. As such, the link detection component 126 analyzes the end-to-end connection availability of the multiple carrier networks 122-124, e.g., via sending test packets (e.g., pings) to the cloud gateway 104 and/or other well-known server. This can be done using more than one of the radios 120, e.g., having one radio used for the current connection and having another of the radios checking other carriers.

The link detection module 126 can use this determination of end-to-end connectivity to make a decision on which carrier network 122-124 to use. The particular carrier network 122-124 used for connection can be selected via a radio interface 121. The link detection module 126 may have a preference for cellular networks 122-123 that have acceptable connectivity, with the satellite network 124 being a failsafe. The switching between cellular networks 122-123 can be achieved independent of any roaming or cooperation between carriers that run the networks 122-123, and the radios 120 can connect a wide range of frequencies and modulation schemes used by the carriers. The radios 120 may be configured to simultaneously connect using different wireless carrier frequencies and utilizing different modulation/multiple-access schemes (e.g., TDMA, CDMA, OFDMA).

Based on determinations made by the link detection component 126, frequency management component 127 can set the radio frequencies used to by radios 120 for a given network via radio interface 121. The frequency management component 127 may also manage mapping between detected frequencies and different carriers. For example, the frequency management component 127 may maintain a list of frequencies for all regional carriers, and this list can be updated, e.g., via an administrative account of the publish/subscribe interface 118. The frequency management component 127 looks at end-to-end connection quality (e.g., speed, latency, errors) to determine which carrier to use, and can switch wireless carriers even if there is no roaming agreement between different wireless carriers. An authentication component 128 manages access to the different wireless networks, e.g., providing the necessary identifier (e.g., UUID, MSEI) that are linked to the respective wireless carrier accounts. The authentication component 128 may have access to Subscriber Identity Module (SIM) cards or similar hardware if used or needed by the carrier.

A network management component 130 coordinates operations between lower level components 126-128. The network management component 130 also ensures that the underlying complexities of switching between wireless carriers is transparent to higher level functions, e.g., publish/subscribe interface 118. While cellular networks 122-123 may support end-to-end protocols such as Transmission Control Protocol/Internet Protocol (TCP/IP), it may be more difficult to route traffic via the satellite network 124. Also, the above-noted switching between wireless carrier networks may cause problems for applications utilizing a connection-oriented protocol such as TCP/IP. As a result, the illustrated system includes a specialized transport layer 131 that facilitates continued message flow over a communications channel even while the underlying carrier networks are being switched due to performance.

As will be described in greater detail below, the transport layer 131 utilizes the User Datagram Protocol (UDP) over IP networks to transport data. Unlike TCP/IP, UDP is a simple transmission model with no handshaking, sequencing, or guaranteed delivery of packets. The transport layer 131 utilizes its own transport protocol, referred to herein as Tiny Telemetry Transport Protocol (T3P). The T3P is a compact, lightweight protocol for peers communicating over packet based networks. It is designed to minimize bandwidth usage at the expense of throughput and latency. The protocol provides guaranteed delivery of messages. The protocol also supports extension through the user defined packet type.

One advantage of T3P is that it can take into account the possibility that wireless communication carriers can change during a session, and can account for this with little loss of data. Further, while the protocol can guarantee delivery of messages, for some classes of messages, e.g., vehicle location, some of messages may be lost without affecting the usefulness of the system, and so the parameters can be tuned for a particular message type. This can minimize retransmission and delaying of packets. More details of T3P are provided below.

Some legacy applications may still expect a full TCP/IP stack to be available, and so the mobile gateway 102 may utilize an adaptation layer 132 that emulates a TCP/IP application program interface. For example, the adaptation layer 132 may include a library that is linked to executables in place of the standard networking libraries. The adaptation layer 132 accepts calls for creating sockets, retrieving network data, etc., that would normally be serviced by a TCP/IP application program interface of the operating system. The adaptation layer 132 adapts these calls for use by T3P.

Figure 2:
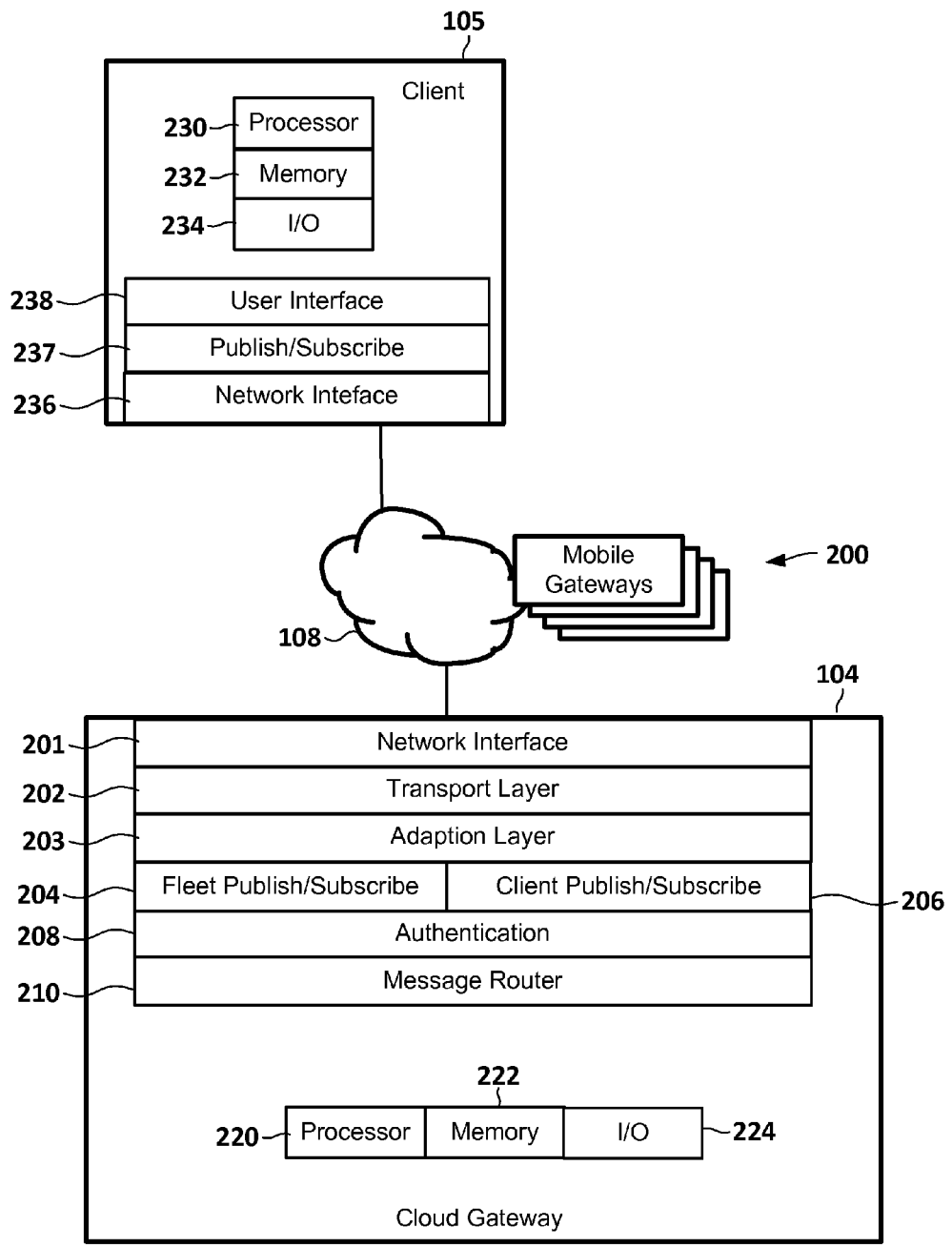
FIG. 2 is a block diagram of a cloud gateway and client within the vehicle data system.

In reference now to FIG. 2, a block diagram illustrates details of the cloud gateway 104 and client 105 in a system according to an example embodiment. The system includes mobile gateways 200, at least some of which may be configured as mobile gateway 102 shown in FIG. 1. The mobile gateways 200 access the wide area network 108 via wireless carriers such as shown in FIG. 1. In some embodiments, the mobile gateways 200 may include a different arrangement, e.g., without analogous publish/subscribe features or network switching features. These different mobile gateways 200 may still be integrated with the cloud gateway 104 and client 105 as will be described in greater detail below.

The cloud gateway 104 includes a network interface 201 which includes hardware capable of communicating over the wide area network 108. The network interface 201 may include an Ethernet adapter that is coupled to local network switches (e.g., as part of a data center local area network) and accesses the wide area network 108 via an Internet gateway (not shown). The network interface 201 receives UDP/IP datagrams from at least some of the mobile gateways 200 via the wide area network 108. A transport layer 202 receives the UDP packets and assembles them into messages in accordance with T3P. The stream of message data formed in this way may be read by legacy applications via an adaptation layer 203 that emulates other network protocols, e.g., TCP/IP. It should be noted that the communication between the mobile gateways 200 and cloud gateway 104 may be two-way. As such, functions described for the transport layer 202 of the cloud gateway 104 may be included in the transport layer 131 of the mobile gateways (see FIG. 1), and vice versa.

The transport layer 202 assembles messages that are used by higher levels of the cloud gateway 104. Message-level communications with the mobile gateways 200 are managed via a fleet publish/subscribe component 204. For mobile gateways 200 that have a corresponding publish/subscribe interface (e.g., component 118 in FIG. 1), the fleet publish/subscribe component 204 may utilize a similar set of protocols to discover published topics and subscribe to a selected set of those topics.

A client publish/subscribe component 206 publishes topics available to the client 105, and allows the client 105 to subscribe to topics and receive data included with the topics, e.g., data streams, sequentially transmitted messages, etc. An authentication component 208 may handle authentication of both mobile gateways 200 and clients 105. Authentication may involve positively determining the identity of a gateway or client, and limiting access to data based on that identity. For example, if a client 105 used by a manager of a trucking company, the client 105 should not be able to access mobile gateway data from other trucking companies.

Similar authentication-based restrictions may be placed on the mobile gateways 200, including potentially restricting access to data of other vehicles even if the other vehicle is associated with the same client. Such authentication may be based on a hardware identifier of the mobile gateways 200 and/or an identity (e.g., login credentials) of occupants currently signed into the mobile gateways 200. For example, upon starting the vehicle, the driver may log into the mobile gateway, thereby providing authentication and permissions that will be used by the mobile gateway when accessing the cloud gateway 104. Authentication methods known the art may be used by the authentication component 208, including passwords, hardware specific keys, two-factor authentication, etc. The authentication may be based on particular hardware and/or personal credentials, and may coordinate with corresponding authentication components on the mobile gateways 200 and client 105.

A message router 210 routes messages between the mobile gateways 200 and clients 105 based on subscriptions. This involves, among other things, providing a published list of topics, receiving a request from a client 105 or mobile gateway 200 to subscribe to one of the topics, monitoring data sources (e.g., client 105, mobile gateway 200, and/or other data source) for incoming data, e.g., messages, that feed the topics, determining subscribers (if any) for the messages based on topic of the message, and sending messages to subscribers of the topics.

The functionality of the cloud gateway 104 can be implemented using conventional computing hardware, as indicated by processor 220, memory 222, and input/output circuitry (I/O) 224. Generally, the functional components 201, 204, 206, 208, 210 may be implemented at least in part via software operable on the processor 220. The functions of the cloud gateway 104 may be distributed across multiple computers, e.g., via a clustered computing arrangement. The client 105 may also include conventional computing hardware such as a processor 230, memory 232, and I/O 234, and may include functional modules such as network interface 236, publish/subscribe interface 237, and user interface 238.

The network interface 236 may include commonly available hardware and software for accessing the wide area network 108, e.g., Ethernet network interface and a network-capable operating system. Because the cloud gateway 104 handles the particulars of T3P, the client 105 need not have and adaptations to read the messages via the wide area network 108. The publish/subscribe interface 237 and user interface 238 may be custom software components and/or use existing software such as a web browser, email client, text messaging client, etc. The publish/subscribe interface 237 interacts with the client publish/subscribe component 206 of the cloud gateway 104 to subscribe the client 105 to various data feeds from the mobile gateways 200. Similarly, the client 105 can publish data (e.g., dispatch messages) that can be subscribed to by the client publish/subscribe component 206, and the mobile gateways 200 can in turn subscribe to the data via the fleet publish/subscribe service.

Figure 3:
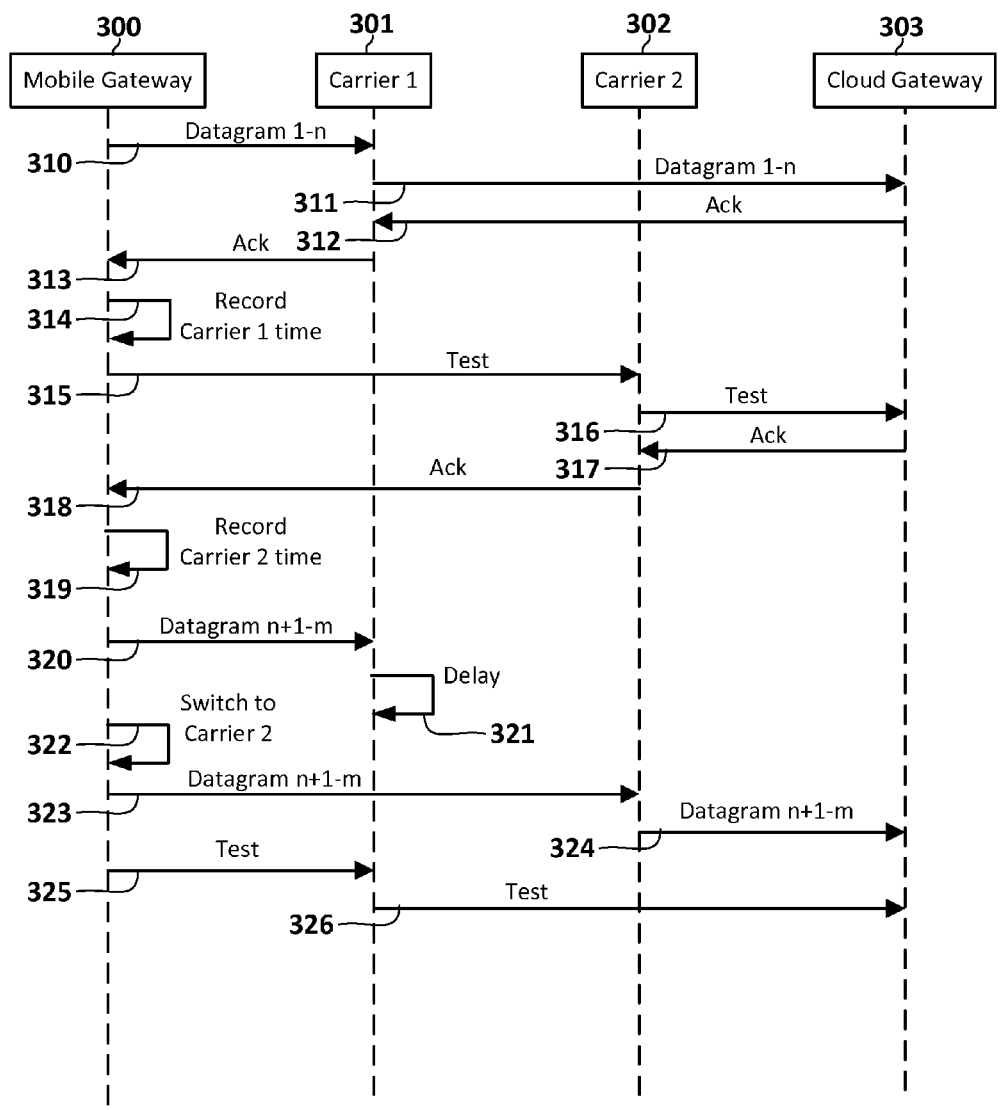
FIG. 3 is a sequence diagram illustrating operation of a vehicle data system according to example embodiments.

In FIG. 3, a sequence diagram illustrates how a mobile gateway 300 can switch networks according to an example embodiment. The mobile gateway 300 is currently in an existing data session with cloud gateway 303 via a first wireless carrier 301, as indicated by datagram transmissions and acknowledgements in exchange 310-313. For each such exchange, a performance measure (e.g., return time, whether or not retransmission was needed, and for how many datagrams) is recorded 314. It will be understood that a protocol such as T3P may send out multi-packet messages that do not require acknowledgements. In such a case, a similar measure may be obtained by sending small test messages that do require an acknowledgement, and recording 314 the performance measure of those test messages. As indicated by test message exchange 315-318, the performance of a second wireless carrier 302 is also tested and recorded 319, generally contemporaneously with the existing data session via the first wireless carrier 301, which includes data exchange 310-313.

A next set of datagram exchanges are begun via transmission of datagrams 320, but as indicated by wait state 321, the delivery is delayed. This is detected by the mobile gateway 300, which switches 322 to the other carrier 302. The existing data session involving already sent datagrams 1-m is continued using the second carrier 302. Continuing the session may involve re-sending (via the second wireless carrier 302) data already sent but not acknowledged via the first wireless carrier 301. In this example, this involves sending the same datagrams (n+1 to m) are sent 323, 324 via the second carrier 302 as were sent at 320 via the first carrier. This may be preferable to waiting for an acknowledgement for datagrams 320, and assuming the cloud gateway 303 can deal with duplicate packets if and when the datagrams 320 are delivered. As long as at least one acknowledgement is received, it shouldn't matter which carrier ultimately delivered the data, and a duplicate acknowledgement (if both transmissions went through) can be ignored.

Alternatively, the next datagrams 323-324 sent by the second wireless carrier 302 may be the next in the sequence, e.g., m+1 to p in this case. In such a case, two sessions may be open at once. The first session involving datagrams 320 will remain open until that data is delivered via first wireless carrier 301 (or until it times out). The second session involves datagrams 323, 324 and will remain open so long as performance measures for the wireless carrier 302 are favorable.

The mobile gateway 300 may make the determination to switch 322 wireless carriers based on a number of factors. For example, so long as a currently used wireless carrier has performance above a threshold, it may be continued to be used even if other wireless carriers currently have superior performance measures. However, if the current wireless carrier is expensive (e.g., a satellite network), then the wireless carrier may be switched as soon a less expensive carrier (e.g., cellular network) has acceptable performance. The measure of performance may be time-averaged so that performance spikes don't unduly affect rating or result in excessive switching.

As noted above, the mobile gateway 300 and cloud gateway 303 may utilize T3P for transport across the wireless carriers 301, 302. The mobile gateway 300 and cloud gateway 303 may have different roles and so may behave differently. For example, most of the data transfer is assumed to be from the mobile gateway 300 and cloud gateway 303, and data transferred in the other direction may be less frequent and/or use smaller messages (e.g., acknowledgements, status).

The T3P supports a maximum of 256 concurrent in-flight messages between a mobile gateway (or other mobile device) and a cloud gateway (or other infrastructure device). Each message may be broken into a maximum of 262 packets. The maximum message size is dependent on the maximum data payload size of the underlying protocol. When used over UDP, the entire message size may be kept to 512 bytes or less so that it is very unlikely that a packet will be fragmented. This can improve reliability. T3P uses a packet based protocol such as UDP/IP and Iridium protocols. The T3P packets do not contain a size field, and so is not intended for use with a streaming protocol such as TCP. Each T3P packet is assumed to be contained entirely within one packet of the underlying protocol layer.

The T3P uses authentication and encryption a for data security. Each device is assigned a password. This password may be used to form a shared secret key, or used to generate a public/private key pair. The password is used to encrypt message data. Authentication is performed by attempting to decrypt a message. If the message is decrypted successfully it is also authenticated. Tables 1-7 below describe particular features of a current version of T3P.

In Table 1, various T3P timeouts are listed. These timeouts may be used by sender or receiver as appropriate. In Table 2, various other T3P configurations are shown. Table 3 describes standard data types used in header and packet data. Table 4 shows the fields for T3P packet headers. This header is the first byte in all the packets. Any packet may be compressed or uncompressed as appropriate.

TABLE 1

Protocol Timeouts

| Name | Value | Description |
|---|---|---|
| Ack Interval Timeout (AIT) | Configured | The interval between packet acknowledgements. Ack Packets are sent at this interval for messages that have been completed since the last ack was sent, messages that new packets have been received for since the last ack was sent regardless of whether they were already complete, and all messages that are incomplete. If there is too much data to fit in a single packet multiple Ack Packets are sent. |
| Gap Notification Timeout (GNT) | >AIT | The minimum time a gap must exist before it is included in an Ack Packet. |
| Packet Resend Timeout (PRT) | 4 * AIT | The time to wait to resend a packet that has not been acked. Packets that are identified as gaps by the receiver are resent immediately without regard for this timer. |
| Receive Time To Live (RTTL) | 2.5 * PRT | This is the time the receiver must consider any Data Packets received for a specified message # to be part of the same message. After this timeout the message is discarded regardless of whether it is complete and any new Data Packets received with the same message # are considered part of a new message. This timer is restarted every time a Data Packet for this message is received. |
| Send Time To Live (STTL) | 1.5 * RTTL | This is the time the sender must wait from the time all the sent packets are acked before it may reuse the message # for a new message. This timer is started when all that message's packets have been acked. If duplicate acks are received for that message the timer must be restarted. |

TABLE 2

Protocol Configuration

| Name | Description |
|---|---|
| Ack Interval Timer (AIT) | See the section on protocol timers. This value must be the same on the device and back office. |
| Max In-Flight Packets (MIFP) | Maximum in-flight packets. This is the maximum number of unacked packets an end point may have outstanding. Once this value is reached the end point may not send more packets until some of the unacked ones are acked. This number should be configured to ensure congestion is minimal. If this is too high the receiving end-point may drop packets because it is unable to handle the volume. This value need not be the same on the device and back office. |
| Immediate Ack Threshold (IAT) | If the receiver has this many unacked packets awaiting the next AIT interval to send an Ack Packet then an immediate ack is triggered. This is expressed as a percentage of the MIFP. 75% (0.75) is a good starting value. The AIT is restarted if this is triggered. |

TABLE 3

Data Types

| Type | Description |
|---|---|
| Bit | A single bit |
| UInt | Unsigned Integer. The number following it is the number of bits in the value (e.g. UInt8 is 8 bits) |
| VInt | Variable length integer. This field may be 1-9 bytes long. Values are $0 - (2^{62} - 1)$. The first bit (bit 0) of this value has different meanings depending on the packet and field it is used in. The packet descriptions will define the meaning of bit 0 for each field of this type. The second bit (bit1) of the first byte is 1 if there is another byte in the value. The last 6 bits of the first byte are the 6 most significant bits of the value. The first bit (bit 0) of each subsequent byte is set if there is another byte in the value. The last 7 bits of each subsequent byte are the next 7 bits of the value. |
| byte[ ] | An array of bytes |

TABLE 4

Packet Header

| Bytes | Bits | Type | Name | Description |
|---|---|---|---|---|
| 1 | 0-1 | UInt2 | Packet Type | 0 = Ping, 1 = Data, 2 = Ack, 3 = User Defined |
|  | 2 |  |  | Reserved |
|  | 3-5 |  |  | Packet specific flags. These flags have different meanings, or are unused, for each packet type. |
|  | 6 |  |  | Reserved |
|  | 7 | Bit | Packet Compressed | All the bytes in the packet following this one are compressed. |

TABLE 5

Ping Packet

| Bytes | Bits | Type | Name | Description |
|---|---|---|---|---|
| 1 | 0-1 | UInt2 | Packet Type | 0: Ping |

TABLE 5-continued

Ping Packet

| Bytes | Bits | Type | Name | Description |
|---|---|---|---|---|
| | 2 | | | See the header section above for details |
| | 3-5 | | | Reserved |
| | 6-7 | | | See the header section above for details |
| 0, 4 | 0-31 | UInt32 | Device ID | This is a unique number identifying the device. This will only be sent by the device if it is the first packet in a session. This is never used in packets sent to the device. |

Table 6 shows the fields of a data packet. Data packets are used to send message data, in particular messages that contain business intelligence. The message may be contained in a single Data Packet or fragmented across multiple packets. Data packets may have the Optional Delivery flag set, which will suppress acknowledgement of the message and cause any corrupt messages (corrupt packet, dropped packet, etc.) to be discarded. Each packet may be compressed and/or the entire message payload may be compressed. Typically the smaller of the compressed and uncompressed payload sizes is used. A CRC is included to verify the integrity of the packet. If a duplicate Data Packet is received the receiver treats it as if it is being received for the first time. If it was already acked then it will need to be acked again.

Table 7 shows fields of the ack packet. Ack packets are sent at the AIT interval and when the number of outstanding unacked packets reaches the MIFP threshold. Each ack packet contains the following: the message numbers for all messages that were completed since the last ack was sent; the message and max contiguous sequence numbers for all incomplete messages; and the non-contiguous sequence ranges for gaps that have existed for at least the GNT.

One additional type of packet that is not shown in the tables is a user defined packet. A user defined packet uses the same header as other packets. The rest of the packet format is user defined. This is an extension point to allow customization of the protocol. Custom protocol extensions create their own user defined packet to add functionality at the protocol level. The use defined packet is not intended for transporting business data, as that is the intention of the data packet.

TABLE 6

Data Packet

| Bytes | Bits | Type | Name | Description |
|---|---|---|---|---|
| 1 | 0-1 | UInt2 | Packet Type | 1: Data |
| | 2 | | | See the header section above for details |
| | 3 | Bit | Optional Delivery | 1 if delivery of this message is optional. If packets are lost then the message is discarded. No ack messages are sent. This flag must be the same across all packets in the message. |
| | 4 | Bit | Payload Compressed | 1 if the payload is compressed. This flag must be the same across all packets in the message. The payload is compressed in its entirety. |
| | 5 | Bit | Multi-Packet | 1 if this is a multi-packet message. Multi-packet messages have a sequence number in each packet. Single packet messages do not. |
| | 6-7 | | | See the header section above for details |
| 0, 4 | 0-31 | UInt32 | Device ID | This is a unique number identifying the device. This will only be included in packets from the device where Multi-Packet is 0 or Sequence # is 0. This is never used in packets sent to the device. |
| 2 | 0-15 | UInt16 | Packet CRC | CRC all the following bytes in the packet. This is calculated before the packet is compressed. |
| 1 | 0-7 | UInt8 | Message # | Identifies this message among the in-flight data messages. This message can be broken up into multiple packets with sequential sequence numbers. |
| 0-9 | 0 | Bit | Message Continued | 1 if this message is continued in more packets. 0 if this is the last packet in the message. This field is not included for single packet messages. |
| | 1-71 | VInt | Sequence # | Sequence of packets in a data message. This must be 0 for the first packet in the message and increment for each additional packet in the message in order. This field is not included for single packet messages. |
| 2 | 0-31 | UInt16 | Payload CRC | CRC of an the bytes in the message payload (across all packets if this is a multi-packet message). This is calculated before the packet is encrypted then this field and the entire payload are encrypted together before being fragmented across packets. This will only be included in packets where Multi-Packet is 0 or Sequence # is 0. |
| n | | byte[ ] | Payload | Message payload. If this is not a multi-packet message this is the entire payload. If it is a multi-part message this is a fragment of the payload. |

TABLE 7

Ack Packet

| Bytes | Bits | Type | Name | Description |
|---|---|---|---|---|
| 1 | 0-1 | Bit | Packet Type | 2: Ack |
|  | 2 |  |  | See the header section above for details |
|  | 3 | Bit | Partial Ack | 1 if this is only an ack of some of the packets in a message. 0 if this is an ack of the complete message (all packets for the message have been received). If 0 then there is no Max Sequence # following this. |
|  | 4-5 | UInt2 | Status | 0 = Success: The message was delivered<br>1 = Message Corrupt: The CRC in the packet does not match the calculated CRC<br>2 = No Session<br>3 = Other |
|  | 6-7 |  |  | See the header section above for details |
| 1 | 0-7 | UInt7 | Message # | The Message # of the message being acked. This field and the sequence number fields below repeat for each message being acked. |
| 1-9 | 0 | Bit | Continued | 1 if there is a Low Sequence # field following this |
|  | 1-71 | VInt | Max Sequence # | Highest contiguous sequence number the sender has received for the message |
| 1-9 | 0 | Bit | Continued | 1 if there is another Low and High sequence number field pair following this one. |
|  | 1-71 | VInt | Low Sequence # | First non-contiguous sequence number the sender has received for this message after the sequence number above. This field and the High Sequence # field repeat for each range of sequence numbers being acked. |
| 1 | 0 | Bit | Unused | Must be 0 |
|  | 1-71 | VInt | High Sequence # | Last contiguous sequence number the sender has received for this message after the one above. |

Figure 4:
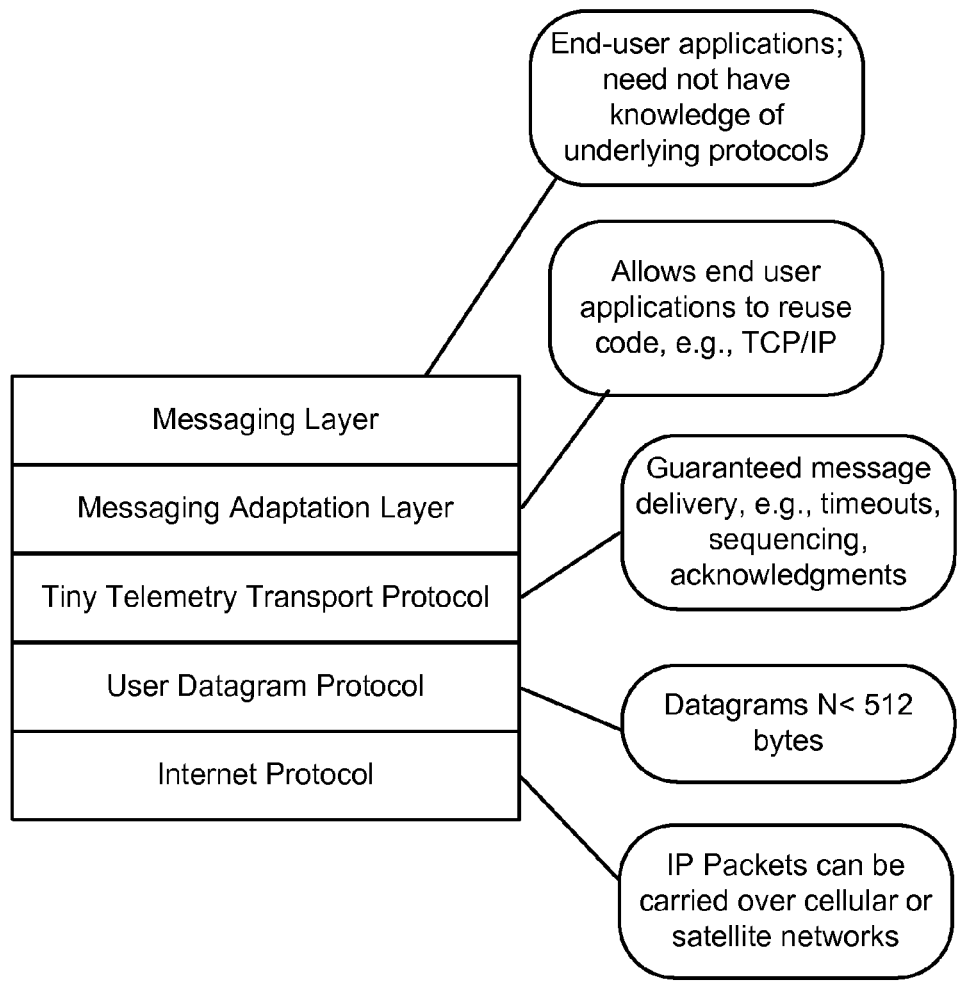
FIG. 4 is a block diagram illustrating an example of how the T3P fits in with UDP/IP.

In FIG. 4, a block diagram illustrates an example of how the T3P fits in with UDP/IP. The messaging adaptation layer, which may provide TCP/IP compatibility with legacy applications, is optional. The messaging layer may be able to utilize the T3P directly, and thereby take tailor operation to correspond to a particular role of mobile or infrastructure device.

Figure 5:
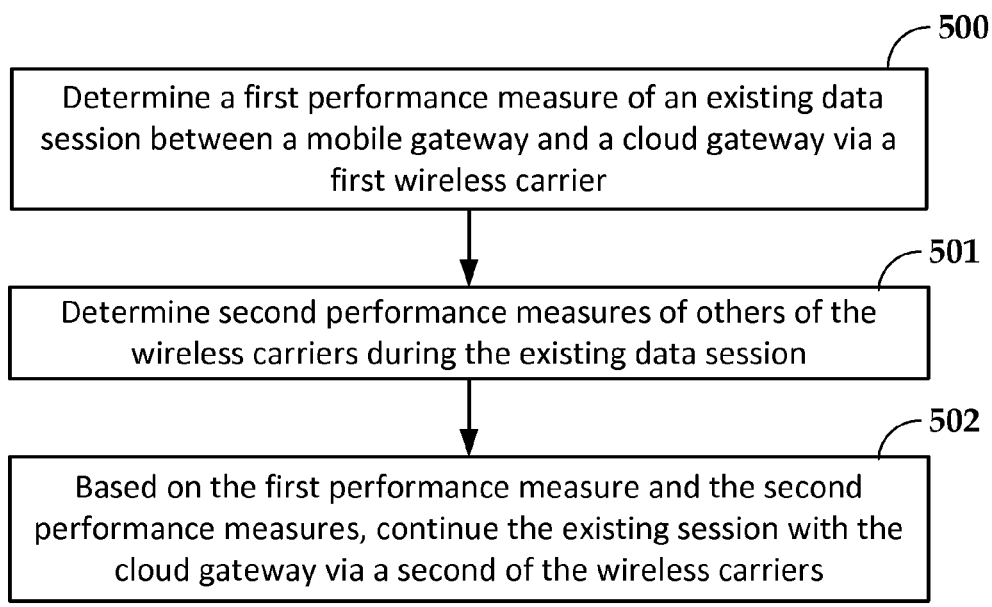
FIGS. 5-7 are flowcharts illustrating methods according to example embodiments.

In reference now to FIG. 5, a flowchart illustrates a method according to an example embodiment. The method involves determining 500 a first performance measure of an existing data session between a mobile gateway and a cloud gateway via a first wireless carrier. The first wireless carrier is selected from wireless carriers including at least one cellular network and a satellite network. Second performance measures are determined 501 of others of the wireless carriers during the existing data session. Based on the first performance measure and the second performance measures, the existing session continues 502 with the cloud gateway via a second wireless carrier selected from the wireless carriers.

Figure 6:
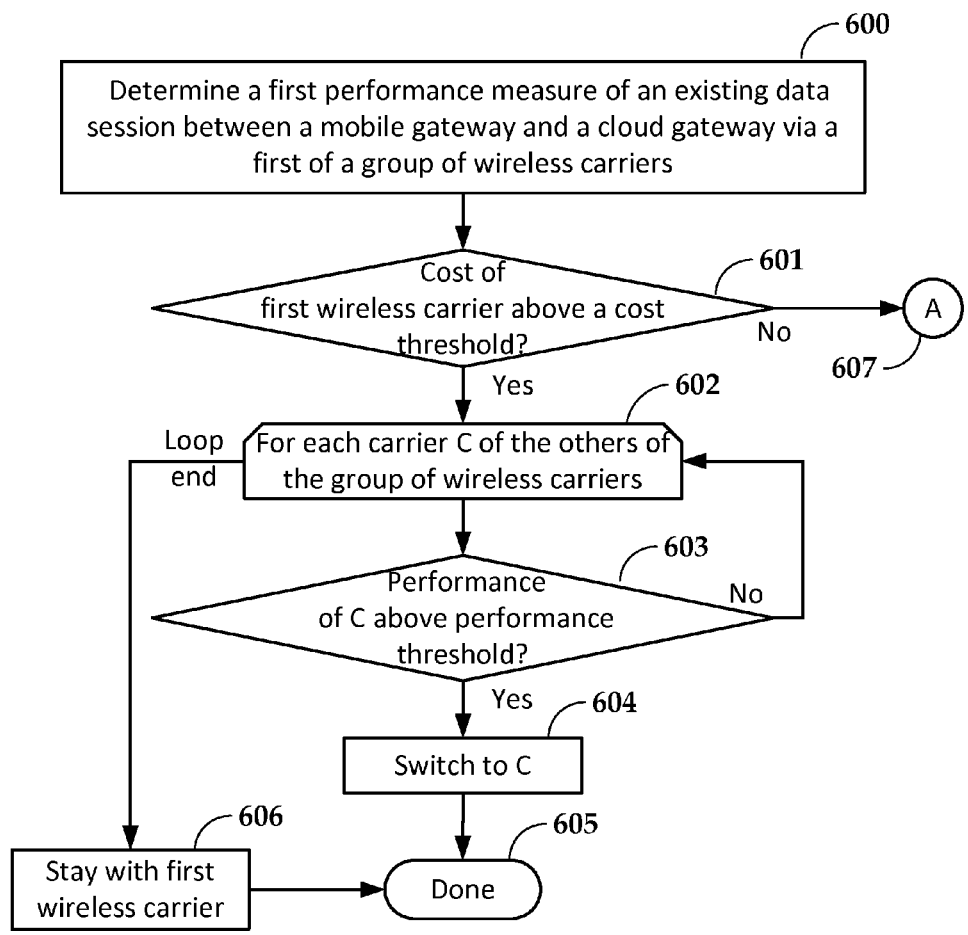
Figure 7:
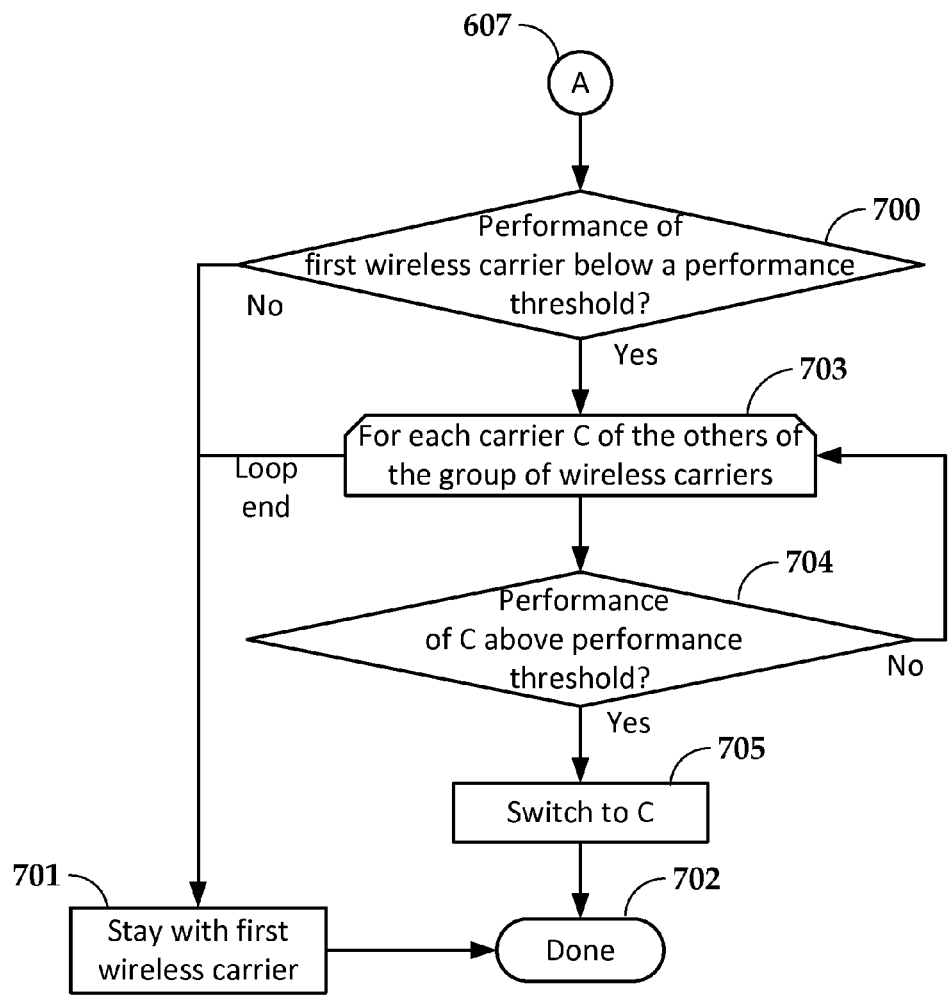

In reference now to FIGS. 6 and 7, flowcharts illustrate a method according to an example embodiment. The method involves determining 600 a first performance measure of an existing data session between a mobile gateway and a cloud gateway via a first wireless carrier. The first wireless carrier is selected from a group of wireless carriers that includes at least one cellular network and a satellite network. A cost of the carrier is compared 601 to a cost threshold. This comparison 601 and the subsequent operations in FIGS. 6 and 7 following comparison 601 may be performed regularly, e.g., based on time intervals, and/or based on a triggering event, e.g., data transmission failure.

Assuming the cost of the carrier is above the cost threshold, a list of others of the group of characters is iterated through as indicated by loop limit 602. For each other wireless carrier C, it is determined 603 whether the performance is above a performance threshold (e.g., minimal acceptable performance). The performance of the other wireless carriers may be regularly updated as described elsewhere herein. If a wireless carrier has the acceptable performance, then the mobile gateway switches 604 to that wireless carrier and the procedure is complete 605. If none of the wireless carriers has the required performance, nothing happens, as indicated by block 606 and the procedure completes at block 605.

If the cost of first wireless carrier determined at block 601 is not above the cost threshold, then control proceeds as indicated by reference 607, to the flowchart of FIG. 7. First, it is determined 700 whether the performance of the first wireless carrier is below a performance threshold. If not, nothing happens, as indicated by block 701 and the procedure completes at block 702. If the performance of the first wireless carrier is below the performance threshold, a list of others of the group of characters is iterated through as indicated by loop limit 703. For each other wireless carrier C, it is determined 704 whether the performance is above a performance threshold (e.g., minimal acceptable performance). The performance of the other wireless carriers may be regularly updated as described elsewhere herein. If a wireless carrier has the acceptable performance, then the mobile gateway switches 705 to that wireless carrier and the procedure is complete 702. If none of the wireless carriers has the required performance, nothing happens, as indicated by block 701 and the procedure completes at block 702.

It will be understood that the terms "first," "second," when describing various components does not imply any relative priority, importance, quality, etc., of the components unless otherwise indicated. Such terms are generally used herein to distinguish and identify like items from a set or group, and no other meaning is intended. A similar caveat applies to terms such as first, last, beginning, middle end, top, bottom, etc., inasmuch as such terms may have been used hereinabove.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts or other diagrams presented herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A mobile gateway comprising:
   a radio interface configured to communicate via wireless carriers that comprise at least one cellular network and a satellite network; and
   a processor coupled to the radio interface and configured to:
     determine a first performance measure of an existing data session with a cloud gateway via a first of the wireless carriers, wherein the existing data session comprises a message formed of multiple User Datagram Protocol (UDP) packets, wherein the UDP packets each include a header that comprises:
       a sequence number indicating a sequence within the message; and
       a message number that identifies the message among in-flight messages of the existing session, the in-flight messages having been sent to but not received by the cloud gateway;
     determine second performance measures of others of the wireless carriers during the existing data session; and
     based on the first performance measure and the second performance measures, continue the existing data session with the cloud gateway via a second of the wireless carriers; and
     wherein the cloud gateway utilizes a timer that starts when a first packet having the message number is received, and additional packets having the message number will be considered part of the message so long as a value of the timer does not exceed a Receive Time to Live (RTTL) value, wherein the RTTL value is more than twice a value of a Packet Resend Timeout (PRT), and wherein the PRT is at least four times an Ack Interval Timeout (AIT).

2. The mobile gateway of claim 1, wherein the header includes an indicator that no acknowledgement is to be sent from the cloud gateway for the multiple UDP packets.

3. The mobile gateway of claim 2, wherein the processor determines the first performance measure by sending test messages requiring an acknowledgement via the first wireless carrier during the existing data session.

4. The mobile gateway of claim 1, wherein the header includes an indicator that acknowledgement is to be sent from the cloud gateway for the multiple UDP packets, wherein the AIT specifies intervals for the acknowledgement.

5. The mobile gateway of claim 4, wherein the AIT for the mobile gateway and the cloud gateway are the same.

6. The mobile gateway of claim 1, wherein the processor determines the second performance measures by sending test messages requiring an acknowledgement via the others of the wireless carriers during the existing data session.

7. The mobile gateway of claim 1, wherein the at least one cellular network comprises two or more cellular networks that do not have a roaming agreement.

8. The mobile gateway of claim 7, wherein the two or more cellular networks utilize different multiple access schemes.

9. The mobile gateway of claim 1, wherein continuing the existing data session via the second wireless carrier based on the first performance measure and the second performance measures comprises determining the first wireless carrier has performance below a performance threshold and the second wireless carrier has a performance at or above the performance threshold.

10. The mobile gateway of claim 1, wherein continuing the existing data session via the second wireless carrier based on the first performance measure and the second performance measures comprises determining the first wireless carrier has cost above a cost threshold and the second wireless carrier has a performance at or above a performance threshold.

11. A method comprising:
    determining a first performance measure of an existing data session between a mobile gateway and a cloud gateway via a first wireless carrier selected from wireless carriers comprising at least one cellular network and a satellite network, wherein the existing data session comprises a message formed of multiple User Datagram Protocol (UDP) packets, wherein the UDP packets each include a header comprising:
      a sequence number indicating a sequence within the message; and
      a message number that identifies the message among in-flight messages of the existing session, the in-flight messages having been sent to but not received by the cloud gateway;
    determining second performance measures of others of the wireless carriers during the existing data session; and
    based on the first performance measure and the second performance measures, continuing the existing data session with the cloud gateway via a second wireless carrier selected from the wireless carriers; and
    utilizing a timer that starts when a first packet having the message number is received at the mobile gateway, wherein additional packets having the message number are considered part of the message so long as a value of the timer does not exceed a Receive Time to Live (RTTL) value, wherein the RTTL value is more than twice a value of a Packet Resend Timeout (PRT), and wherein the PRT is at least four times an Ack Interval Timeout (AIT).

12. The method of claim 11, wherein the header includes an indicator that no acknowledgement is to be sent from the cloud gateway for the multiple UDP packets.

13. The method of claim 12, further comprising determining the first performance measure by sending test messages requiring an acknowledgement via the first wireless carrier during the existing data session.

14. The method of claim 11, wherein the header includes an indicator that acknowledgement is to be sent from the cloud gateway for the multiple UDP packets, wherein the AIT specifies intervals for the acknowledgement.

15. The method of claim 11, further comprising determining the second performance measures by sending test messages requiring an acknowledgement via the others of the wireless carriers during the existing data session.

16. The method of claim 11, wherein the at least one cellular network comprises two or more cellular networks that do not have a roaming agreement and that utilize different multiple access schemes.

* * * * *